June 13, 1967

R. A. NYLANDER 3,325,725

D.-C. VOLTAGE REGULATOR EMPLOYING SERIES TRANSISTOR WHICH IS
SWITCHED TO PROVIDE REGULATION THROUGH DUTY CYCLE
MODULATION OF THE SUPPLY VOLTAGE

Filed March 27, 1964

INVENTOR.
R. A. NYLANDER

BY
ATTORNEY

AGENT

३,३२५,७२५
Patented June 13, 1967

3,325,725
D-C VOLTAGE REGULATOR EMPLOYING SERIES TRANSISTOR WHICH IS SWITCHED TO PROVIDE REGULATION THROUGH DUTY CYCLE MODULATION OF THE SUPPLY VOLTAGE
Richard A. Nylander, Lawndale, Calif., assignor to the United States of America as represented by the Secretary of the Air Force
Filed Mar. 27, 1964, Ser. No. 355,518
1 Claim. (Cl. 323—22)

The purpose of this invention is to provide efficient regulation of direct voltages through the mechanism of duty cycle modulation of the unregulated voltage.

Essentially the regulator circuit comprises a transistor switch connected between the unregulated source and the load. The transistor is switched on and off at a high frequency by an oscillatory circuit incorporating a four-layer diode. The resulting rectangular wave output of the transistor switch is integrated by a filter circuit to derive its average value which is the output voltage of the regulator. The circuit is so designed that the duty cycle of the rectangular wave, to which its average value is proportional, is inversely related to the unregulated supply voltage, with the result that a change in supply voltage changes the duty cycle in such direction as to oppose a change in load voltage.

Figure 1:
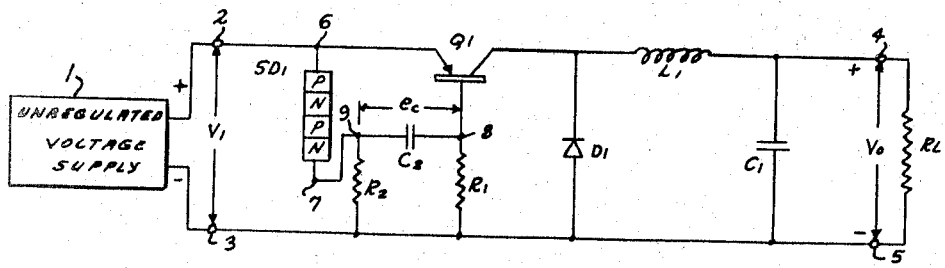
Figure 3:
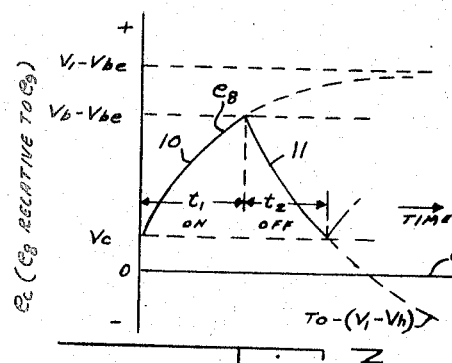
Figure 4:
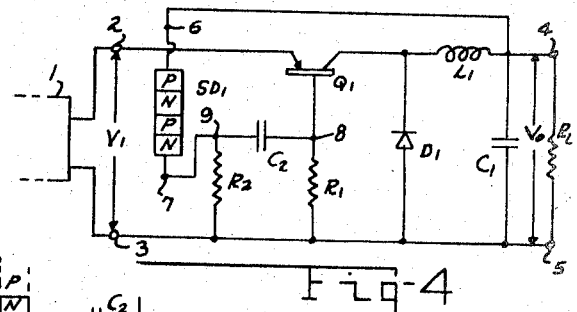
Figure 5:
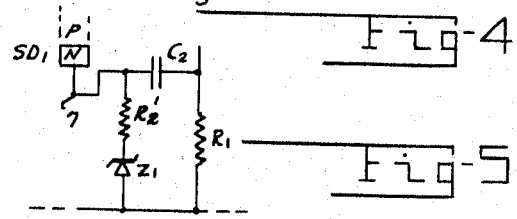
Figure 2:
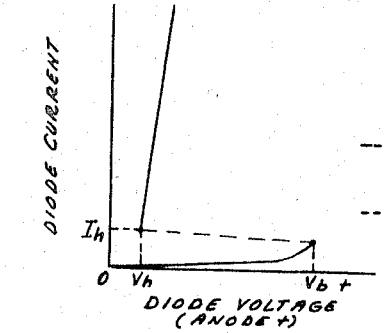
Figure 6:
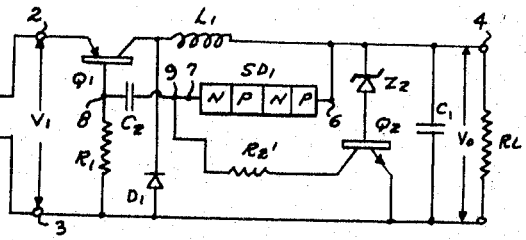

The invention will be described in more detail with reference to the specific embodiments thereof shown in the accompanying drawings in which FIG. 1 is a schematic circuit diagram of one embodiment of the invention, FIG. 2 illustrates the characteristic of a four-layer diode for positive anode voltages, FIG. 3 is a waveform illustrating the switching action of the circuit, FIG. 4 is a modification of FIG. 1 giving improved regulation, FIG. 5 is a further modification using a zener diode and resistor in place of $R_2$ in FIGS. 1 and 4 to further improve regulation, and FIG. 6 is a modification in which $R_2$ of FIG. 4 is replaced with a series connected resistor and the collector-emitter path of a transistor controlled by the output voltage to improve the regulation.

Referring to FIG. 1, an unregulated input voltage from source 1 is applied to input terminals 2–3 of the regulator circuit and the regulated voltage $V_o$ appears at its output terminals 4–5 for application to load $R_L$. Transistor $Q_1$ has its emitter-collector path connected in series with the load. This transistor acts as a switch which may be turned on or off by controlling the base voltage relative to the emitter. When on, there is a very low impedance between emitter and collector; when off, the emitter-collector impedance is very high and analogous to an open switch. As the switch is turned on and off cyclically, a rectangular wave of voltage occurs at the collector. This wave is integrated by a low-pass filter circuit comprising series inductance $L_1$ and shunt capacitor $C_1$. As a result, the voltage across $C_1$ and output terminals 4–5 is proportional to the average value of the rectangular wave. Since the average value of the wave is directly related to its duty cycle, the value of $V_o$ may be controlled by controlling the duty cycle of switch $Q_1$. The diode $D_1$ removes transient negative voltages by providing a discharge path for $L_1$ when $Q_1$ is turned off.

The network consisting of four-layer diode $SD_1$, capacitor $C_2$, resistors $R_1$ and $R_2$, and the emitter-base diode of $Q_1$ form an oscillatory circuit for cyclically switching $Q_1$ on and off. The operation of this circuit may be explained by reference to FIGS. 2 and 3.

FIG. 2 shows the general characteristic of a four-layer diode in the positive anode region. The anode end of diode $SD_1$ is the end of P type material connected to terminal 6. Terminal 7 is connected to the cathode end. The construction and operation of these diodes are well known in the art and described in the literature. Briefly, however, as the diode voltage increases from zero the diode exhibits a very high impedance until the breakover voltage $V_b$ is reached. At this voltage the impedance suddenly drops to a low value similar to the forward impedance of a PN junction. The diode will remain in the low impedance state until the voltage and current are reduced below the holding values $I_h$ and $V_h$. When these values are passed through, the diode reverts to its high impedance state.

To describe the operation, assume $SD_1$ to be in its off or high impedance state and that it had switched to that state at a value of $e_c$, the voltage across $C_2$, equal to $V_c$. FIG. 3 shows the values of $e_c$ measured at terminal 8 relative to terminal 9. Thus, at the start of the waveform in FIG. 3, $e_8$ is negative relative to $e_9$ by the amount $V_c$. Therefore, with $SD_1$ off, $C_2$ charges through the emitter-base diode of $Q_1$ and $R_2$ causing $e_8$ to increase exponentially along part 10 of the waveform from the potential $-V_c$ toward the potential $V_1-V_{be}$, where $V_{be}$ is the very small forward emitter-base voltage of $Q_1$.

As $C_2$ charges, the voltage across $SD_1$ increases since it is equal to $e_c+V_{be}$. Therefore, when $e_c$ reaches the value $V_b-V_{be}$, the voltage across $SD_1$ reaches $V_b$ and this diode switches to its low impedance or on state. When $SD_1$ turns on, the voltage across its terminals drops considerably due to its much lower impedance. This causes the base potential of $Q_1$ to rise relative to the emitter, since $e_c$ can not change immediately, turning this transistor off.

Capacitor $C_2$ now begins to charge in the opposite direction through $SD_1$ and $R_1$ toward the potential $-(V_1-V_h)$ along part 11 of the waveform in FIG. 3. $R_2$ also draws current through $SD_1$. When the sum of these two currents in $SD_1$ has decreased to $I_h$, the holding current of $SD_1$, $SD_1$ reverts to its high impedance or off state and $Q_1$ is again turned on, completing one cycle of operation of the oscillatory circuit. The value of $e_c$ at which the switching action occurs is designated $V_c$ in FIG. 3 and its magnitude may be determined from the following equations:

(1)
$$I_h = \frac{V_1-V_h}{R_2} + \frac{V_1-V_h+V_c}{R_1}$$

where $V_h$ and $I_h$ are the holding voltage and current, respectively, of $SD_1$. Solving (1) for $V_c$ gives (2)
$$V_c = I_h R_1 - (V_1-V_h)\left(\frac{R_1}{R_2}+1\right)$$

$R_1$ should be chosen so that $R_1 = \beta R_L$ for the smallest value of $R_L$, where $\beta$ is the current gain, i.e., the ratio of collector current to base current, for $Q_1$. The minimum value of $R_2$ is $V_1/I_h$. As $R_2$ increases the nominal output voltage $V_o$ increases. The repetition frequency of the oscillatory circuit is determined by $C_2$.

As stated earlier, $Q_1$ acts as a switch between unregulated source 1 and the load. When $Q_1$ is on, source 1 is connected to the load; when off, source 1 is disconnected from the load. As explained above $Q_1$ is on during the time $t_1$ when $C_2$ is charging along part 10 of the waveform FIG. 3 and is off during the time $t_2$ when $C_2$ is charging along part 11 of the waveform. Consequently, the duty cycle of the resulting rectangular wave at the output of switch $Q_1$ is $t_1/t_1+t_2$. $V_o$ is the average value of this wave as derived by filter $L_1$–$C_1$. Therefore, neglecting losses, (3) $$V_o = V_1 \frac{t_1}{t_1+t_2}$$

which may be rearranged to give (4) $$V_o = V_1 \frac{\frac{t_1}{t_2}}{1+\frac{t_1}{t_2}}$$

Neglecting $Q_1$ and $SD_1$ leakage currents (5) $$t_1 = R_2 C_2 \log_e \left[ \frac{V_1\left(\frac{R_1}{R_2}+2\right) - V_{be} - I_h R_1 - V_h\left(\frac{R_1}{R_2}+1\right)}{V_1 - V_b} \right]$$

(6) $$t_2 = R_1 C_2 \log_e \left[ \frac{V_1 - V_h + V_b - V_{be}}{I_h R_1 - \frac{R_1}{R_2}(V_1 - V_h)} \right]$$

The frequency of the oscillatory circuit is (7) $$f = \frac{1}{t_1 + t_2}$$

For a given load voltage $V_o$ and supply voltage $V_1$, $t_1/t_2$ is determined from Equation 4. The load current determines the transistor $Q_1$ type and parameters $\beta$ and $V_{be}$. $R_1$ is determined in turn from $\beta$ and $R_L$ as already pointed out. The particular four-layer diode used for $SD_1$ determines $V_b$, $V_h$ and $I_h$. Then $t_1/t_2$ is a transcendental equation in $R_2$ only. Solution by iterative processes determines $R_2$. The capacitor $C_2$ is determined by the frequency desired. The filter, comprising $L_1$ and $C_1$, becomes smaller as the frequency increases. An upper limitation is imposed on frequency by the switching speeds of $Q_1$.

That the circuit operates as a voltage regulator may be seen from FIG. 3, or it may be shown by substituting in Equations 5 and 6. Using the simpler explanation, it is seen in FIG. 3 that an increase in $V_1$ causes $C_2$ to charge along part 10 of the waveform toward a higher voltage and therefore at a faster rate. Hence, $e_c$ reaches the value $V_b - V_{be}$ sooner and $t_1$ is shortened. In charging in the other direction along part 11, $C_2$ also charges toward a higher voltage and therefore at a faster rate. However, as seen from Equation 2, the magnitude of $V_c$ becomes less as $V_1$ increases. Therefore, $t_2$ remains constant or increases. Consequently, an increase in $V_1$ results in a decrease in $t_1/t_2$ which opposes a change in $V_o$, as seen in Equation 4. The circuit shown in FIG. 1 will hold the load voltage $V_o$ within $\pm 2\%$ for changes in $V_1$ of $\pm 10\%$.

An improvement in regulation in the circuit of FIG. 1 may be obtained by applying the output voltage $V_o$, rather than $V_1$, to the anode of $SD_1$, as shown in FIG. 4. This reduces the $V_o$ variation to $\pm 1\%$ for a $\pm 10\%$ variation in $V_1$. The circuit operation otherwise is the same as for FIG. 1.

Further improvement may be attained by replacing $R_2$ with more complicated networks which control $R_2$ as a function of line or load voltage to regulate the rate at which $C_2$ charges through $SD_1$ and thereby control $t_2$. FIG. 5 shows the replacement of $R_2$ in FIG. 1 or 4 by $R_2'$ connected in series with a zener diode $Z_1$ operated in the region of impedance change. In this way $R_2'$–$Z_1$ becomes a voltage controlled non-linear resistance. Thus, if $V_1$ (FIG. 1) or $V_o$ (FIG. 4) tends to increase the voltage across $Z_1$ increases lowering its impedance so that more of the $SD_1$ current flows through $R_2'$ and $Z_1$ and less through $C_2$. As a result, $C_2$ charges along part 11 of the waveform (FIG. 3) at a slower rate, increasing $t_2$. This causes a greater reduction in the ratio $t_1/t_2$ than would occur in the previously described circuits of FIGS. 1 and 2 using $R_2$. The greater reduction in $t_1/t_2$ more effectively opposes an increase in $V_o$, as seen from Equation 4.

FIG. 6 shows another modification of the regulator of FIG. 4 that is similar in principle to FIG. 5 but which uses the collector-emitter impedance of NPN transistor $Q_2$ in place of the zener diode $Z_1$ of FIG. 5. The zener diode $Z_2$ serves to hold the base of $Q_2$ at a constant potential relative to terminal 4, independently of variations in base-emitter current. Should there be a tendency for $V_o$ to increase in this circuit, the base of $Q_2$ would similarly rise in potential relative to the emitter. This would increase the emitter current and lower the collector-emitter impedance with the result that more of the $SD_1$ current would flow through $R_2'$ and $Q_2$ and less through $C_2$. As in FIG. 5, this slows the charging rate of $C_2$ along part 11 of the waveform in FIG. 3 and increases $t_2$ giving a greater reduction in the $t_1/t_2$ ratio than would occur using a linear resistance for $R_2$. The circuit of FIG. 5 will limit the $V_o$ variation to $\pm 10\%$ in $V_1$.

The above-described regulators, in comparison with linear types in which the voltage is regulated by a variable resistance device, have much higher efficiency since no power is dissipated to drop the voltage, and the nominal output voltage may be set to any level less than about 90% of $V_1$ with no loss in efficiency. The circuit is also smaller in size and lighter in weight, for although the filter choke $L_1$ is required, the high switching frequency permits it to be smaller and lighter than the heat sink that would be necessary in a linear regulator.

I claim:

A voltage regulator circuit comprising: a pair of input terminals, between which an unregulated voltage is applied, and a pair of output terminals, one of said input terminals constituting a point of reference potential; a direct connection of substantially zero impedance between one of said output terminals and said point of reference potential; a switching transistor; an inductive reactor; a conductive connection including the emitter-collector path of said transistor and said reactor as series elements in the order named between the other input terminal and the other output terminal; a capacitive reactor connected across said output terminals; a resistor connected between the base of said transistor and said point of reference potential; a four-layer diode having one terminal connected through a resistor and a zener diode in series to said point of reference potential and through a capacitor to the base of said transistor, said zener diode being operated in the region of impedance change in its breakdown characteristic; and means connecting the other terminal of said four-layer diode to a point on said conductive connection.

References Cited

Sorenson: "Solid-State D-C Switched Regulators," Electronics, Nov. 25, 1960.

JOHN F. COUCH, *Primary Examiner.*

K. D. MOORE, W. M. SHOOP, *Assistant Examiners.*